United States Patent [19]

Takemoto et al.

[11] 4,219,596

[45] Aug. 26, 1980

[54] MATRIX FREE THIN LABELS

[75] Inventors: Shiro G. Takemoto, Glendora; Yukihiko Sasaki, Claremont, both of Calif.

[73] Assignee: Avery International Corporation, San Marino, Calif.

[21] Appl. No.: 849,235

[22] Filed: Nov. 7, 1977

[51] Int. Cl.[2] .......................... B32B 3/10; B32B 27/16

[52] U.S. Cl. ........................................ 428/41; 40/2 R; 427/42; 427/43.1; 427/208.8; 427/44; 156/231; 156/238

[58] Field of Search .................................... 428/40–42, 428/914; 40/2 R; 427/42, 43

[56] References Cited

U.S. PATENT DOCUMENTS

| | | | |
|---|---|---|---|
| 1,946,865 | 2/1934 | Kubin | 156/237 |
| 2,391,539 | 12/1945 | Avery | 156/259 |
| 2,558,803 | 7/1951 | Wittgren | 428/914 X |
| 2,574,152 | 11/1951 | Lewis et al. | 428/40 |
| 2,800,215 | 7/1957 | Converse | 428/40 X |
| 3,013,917 | 12/1961 | Karlan et al. | 427/146 |
| 3,021,250 | 2/1962 | LaVoie | 428/40 X |
| 3,166,186 | 1/1965 | Karn | 428/42 |
| 3,312,005 | 4/1967 | McElroy | 428/42 X |
| 3,519,525 | 7/1970 | Jackstadt | 428/914 X |
| 3,684,544 | 8/1972 | Piron | 427/147 |
| 3,684,545 | 8/1972 | Worrall | 428/202 |
| 3,844,916 | 10/1974 | Gaske | 260/40 R X |
| 3,857,768 | 12/1974 | Kagiya | 526/16 X |
| 3,959,521 | 5/1976 | Suetsugi et al. | 428/425 X |
| 3,989,609 | 11/1976 | Brack | 428/423 X |
| 4,008,115 | 2/1977 | Fairbanks et al. | 428/41 X |
| 4,022,926 | 5/1977 | Keough et al. | 428/914 X |

FOREIGN PATENT DOCUMENTS

| | | | |
|---|---|---|---|
| 589276 | 12/1959 | Canada | 428/914 |

*Primary Examiner*—Henry F. Epstein
*Attorney, Agent, or Firm*—Christie, Parker & Hale

[57] ABSTRACT

A label construction comprises a temporary carrier web having a release surface and a label releasably adhered to the release surface. The label comprises a radiation cured face film in contact with the release surface of the carrier web and a layer of pressure sensitive adhesive on the side of the label opposite the carrier web, and may comprise indicia between the face film and the layer of adhesive. A protective backing covers the adhesive and has a second release surface in contact with the adhesive. Adhesion between the release surface of the protective backing and the layer of adhesive is weaker than adhesion between the release surface of the temporary carrier web and the face film. The protective backing can be removed from the label to expose the adhesive while leaving the label releasably adhered to the carrier web. The exposed adhesive is applied to a substrate and the temporary carrier web is removed, leaving the label adhered to the substrate.

10 Claims, 7 Drawing Figures

Fig. 1
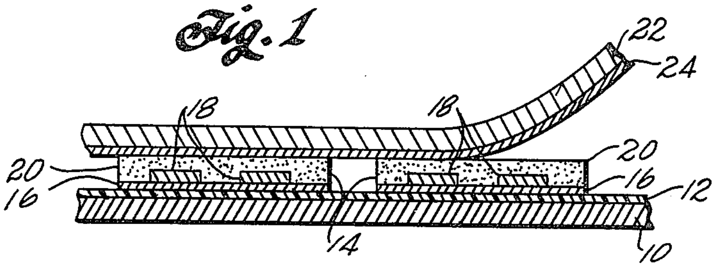
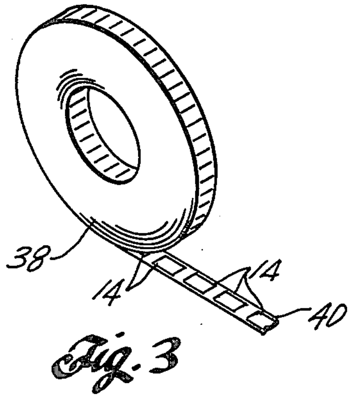
Fig. 3
Fig. 2
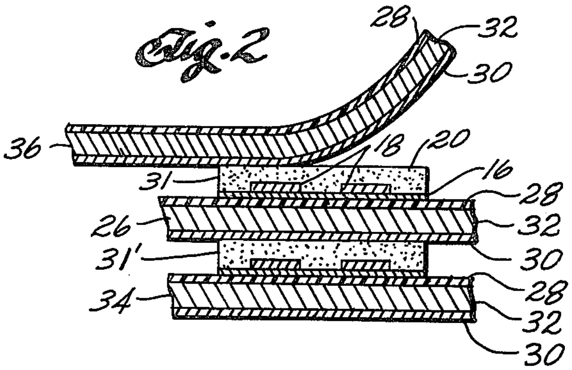
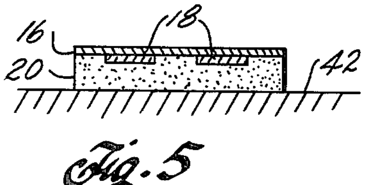
Fig. 5
Fig. 4
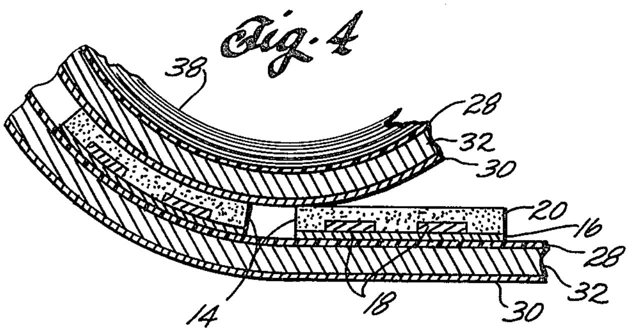
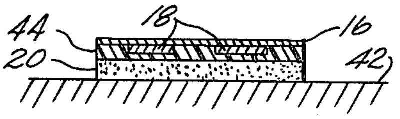
Fig. 6

MATRIX FREE THIN LABELS

BACKGROUND OF THE INVENTION

This invention relates to pressure sensitive adhesive label construction, particularly to thin label constructions having radiation cured face films.

Conventional pressure sensitive adhesive labels are adhered to the release surface of a carrier web in spaced apart relation. The web may be a plastic film but is usually a smooth paper, such as glassine, or kraft coated with a silicone release layer. The labels include a layer of pressure sensitive adhesive in contact with the release layer on a carrier web and a label facestock which may include indicia in one or more colors printed over the label facestock. The facestock may be paper or plastic such as vinyl. Indicia take the form of printed words, letters, or designs. Because such indicia are printed over the label facestock, they are subject to wear and abrasion. Clear protective coatings are sometimes applied over the indicia. Such labels, with or without printed indicia, are referred to as "laid-on" labels and they are in wide commercial use for attachment of various articles and materials for identification, advertising, decoration, or protection.

Laid-on labels are made by die cutting as described in U.S. Pat. Nos. 2,391,539 and 3,166,186, for example. A sheet or roll of a laminated construction comprising a layer of label facestock, a layer of pressure sensitive adhesive, and a temporary carrier web having a release surface in contact with the adhesive is provided. Discrete labels are formed on the carrier web by die cutting through the label facestock and the adhesive layer, without cutting through the carrier web, to define the periphery of individual labels. The facestock and adhesive surrounding the individual labels remain as a continuous, skeletal web or matrix which is then stripped from the carrier web leaving discrete spaced apart labels adhered to the carrier web. Indicia may be printed on the labels before or after die cutting and stripping of the matrix. Protective coatings may also be applied before or after stripping of the matrix. The practice of making laid-on labels by die cutting and stripping of matrix is wasteful of materials and entails the use and maintenance of precision die cutting machinery.

Laid-on labels having an adhesive layer in contact with the release surface of a carrier web are typically dispensed in one of two ways. An individual label may be manually peeled from the carrier sheet and applied to a substrate. Alternatively, the carrier web may be bent over a sharp angle, for example, by drawing the carrier across an edge. The label is less flexible than the carrier web and fails to follow the carrier around the sharp angle, but instead becomes at least partly separated from the carrier web. The separated portion of the label may be applied directly to a substrate or grasped manually for removal from the carrier web. In both of these methods of label dispensing it is necessary that the label itself have sufficient rigidity and strength to survive removal from the carrier film and transfer to a substrate. In addition when a label is manually removed from carrier web it must have sufficient thickness to be readily grasped by the user.

SUMMARY OF THE INVENTION

In accordance with this invention, a label construction comprises a temporary carrier having a first release surface and a label releasably adhered to the release surface. The label comprises a face film in contact with the release surface and a layer of pressure sensitive adhesive on the side of the label opposite the carrier. The face film comprises radiation cured polymer. A protective backing having a second release surface is in contact with the adhesive layer. The adhesion between the adhesive and the release surface of the protective backing is weaker than the adhesion between the face film and the release surface of the carrier web, whereby the protective backing can be removed from the label to expose the adhesive while leaving the label releasably adhered to the carrier web.

A preferred label construction in accordance with this invention comprises a temporary carrier web having a first release surface and a protective backing having a second release surface and a plurality of discrete labels releasably adhered to the first release surface. In a preferred self-wound embodiment such temporary carrier web can also be the protective backing (i.e., the carrier web has first and second release surfaces on opposite sides of the carrier web). Each label comprises a face film in contact with the first release surface, a layer of pressure sensitive adhesive on the side of the label opposite the carrier web, the face film comprising radiation cured polymer, and indicia between the face film and the layer of pressure sensitive adhesive.

A label construction according to this invention is made by forming discrete label face films releasably adhered to a release surface of a carrier web by coating discrete areas on the release surface which correspond to labels being formed with at least one layer of radiation curable liquid and curing the liquid by exposure to polymerizing radiation. Pressure sensitive adhesive in liquid form is applied over the discrete label face films substantially in register with the label face films and is solidified. Discrete labels are thus formed, each having a face film releasably adhered to the first release layer on the carrier web and a pressure sensitive adhesive on the side of the label opposite the carrier web. The pressure sensitive adhesive is covered with a protective backing having a release layer in contact with the adhesive. Polymerizing radiation may be ultraviolet radiation or ionizing radiation such as electron beam or gamma radiation.

BRIEF DESCRIPTION OF THE DRAWING

In the accompanying drawing:

FIG. 1 is a cross-sectional view of a pair of labels of the present invention in which a protective backing is shown covering the adhesive of one label and partially removed from the adhesive of the other label;

FIG. 2 is a cross-sectional view of a pair of labels formed on temporary carrier web having two release surfaces and arranged in a stack so that a release surface on one portion of the carrier web is in contact with adhesive of a label on another portion of carrier web;

FIG. 3 illustrates in perspective a partly unwound roll of labels;

FIG. 4 is a cross-sectional illustration of a portion of the roll of FIG. 3 showing the orientation of the label as it is unwound from the roll;

FIG. 5 shows a label of the present invention after application to a substrate;

FIG. 6 shows a label of the present invention having an opaque layer behind and around the indicia, under the face film of the label.

DETAILED DESCRIPTION OF THE INVENTION

Figure 7:
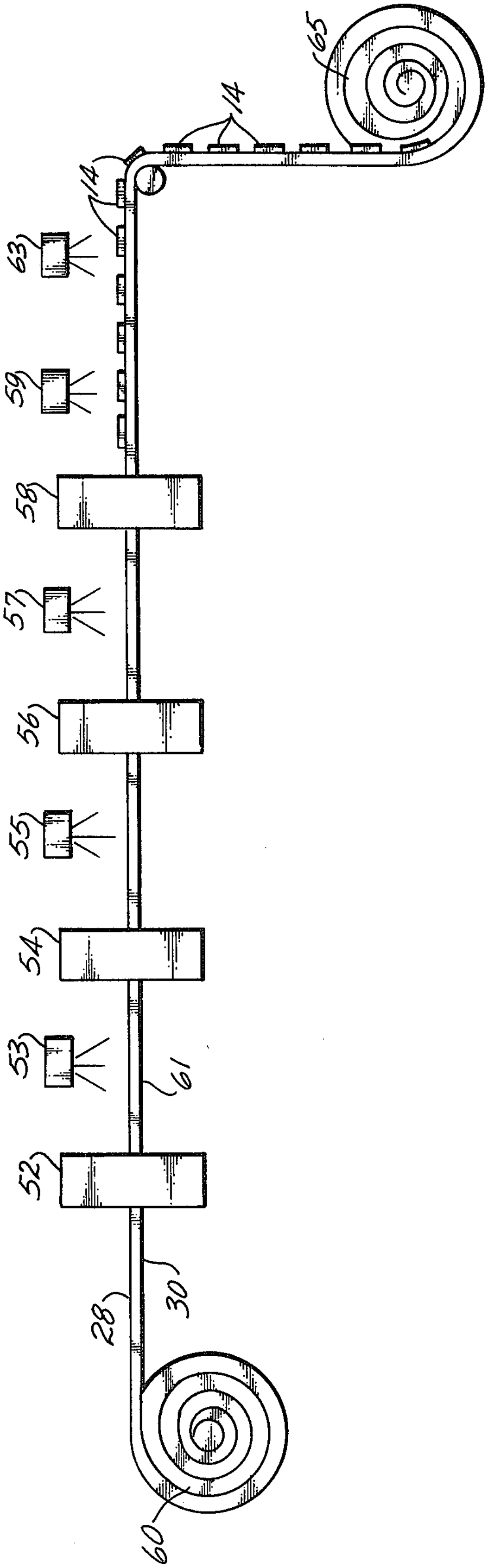
FIG. 7 is a schematic representation of a method of making label construction of this invention.

FIG. 1 illustrates a label construction according to this invention. A temporary carrier web 10 having a release surface 12 supports two labels 14. Each label has a face film 16 releasably adhered to the release surface 12. Indicia 18 are printed on the face film 16, and both the indicia and portions of the face film not covered by the indicia are covered with a layer of pressure-sensitive adhesive 20. A backing sheet 22 having a release surface 24 protects the adhesive from dust and dirt. The adhesion between the adhesive 20 and the release surface 24 of the protective backing is weaker than the adhesive between the face film 16 and the release surface 12 of the carrier web. Thus, the protective backing can be removed, leaving the label 14 releasably adhered to the carrier web. Adhesion between the layer of adhesive 20 and a substrate to which the label is applied is stronger than adhesion between the face film 16 and the release surface 12 on the carrier web, so that when the adhesive is pressed into contact with a suitable substrate, such as paper, metal, wood, hardboard, glass, or a painted surface, the carrier web can be removed leaving the label adhered to the substrate.

Such a label construction provides a number of advantages. When the protective backing is removed, the label remains releasably adhered to the carrier with the adhesive side facing out. Thus, the label need not be removed from the carrier for application to a substrate, but can be applied to the substrate while still adhered to the carrier. The indicia are between the face film and the adhesive. When the label is applied to a substrate, as shown in FIG. 5, the indicia are protected from wear, abrasion, and solvents by the face film. Thus, there is little or no need for a wear-resistant overcoating on labels of this invention to protect the indicia.

A great advantage is that such labels may be made very thin, having a face film (excluding indicia and adhesive) with a thickness in the range of from about 0.1 to about 2.0 mil, preferably from about 0.1 to about 1.5 mil, (a mil being 0.001 inch). Thicker labels may of course be made. Such thin labels may be too thin to be removed manually from a carrier web. Thin labels of this invention may be too flexible to be dispensed in the ordinary way by drawing the carrier over a sharp angle, because a thin, flexible label will follow the flexible carrier without becoming partially detached therefrom. Providing an adhesive layer on the label on the side opposite the carrier web enables the user to transfer a label directly from the carrier to a substrate, even when the label is too thin and fragile to survive manual removal from the carrier.

Such thin labels are highly decorative and appear almost to become part of the substrate to which they are applied. When a transparent face film and a transparent adhesive are used, indicia in such labels appear to be printed directly upon the substrate rather than being merely "stuck on." Application of such labels to a particular substrate, such as a curved container, may be easier than printing indicia directly on the substrate, and indicia in the labels are protected from wear by the face film. Such labels may be destructible, i.e., they may be impossible to remove in one piece from a substrate. Destructible labels have many useful applications.

The label face film 16 comprises radiation-cured polymeric material that is formed by applying substantially solvent-free radiation-curable liquid to the release surface of the carrier web in at least the discrete area corresponding to a label being made and curing the liquid to a solid state by exposure to polymerizing radiation. Curing the liquid on the release surface of the carrier web forms a solid label face film releasably adhered to the release surface, the face film comprising a reaction product of radiation curable monomers. When ultraviolet radiation is used to cure the liquid, the face film also comprises a residue of at least one photoinitiator formed by exposure thereof to ultraviolet light. A plurality of label face films 16 may be formed on a carrier web by applying radiation-curable liquid to a plurality of discrete, spaced apart areas on the release surface corresponding to the labels being made. The liquid is applied as a continuous liquid film within each discrete area, but is not applied to portions of the release surface outside of the discrete areas, e.g. portions of the release surface between adjacent discrete areas.

The label face film 16 may be opaque, translucent, or substantially transparent, and may be colored or colorless. An opaque face film is useful when a label without indicia 18 is made. Transparent face films permit indicia to show through clearly. When indicia 18 are present in the label, it is, of course, desirable to have a face film that is sufficiently transparent or translucent for the indicia to show through.

The label face films may comprise more than one layer of radiation-cured polymers. Polymer of each layer may be the same or different. Each layer may be cured separately, or a plurality of layers of radiation-curable liquid may be applied and then cured at the same time. For example, a label face film may comprise a hard, wear-resistant layer in contact with the release surface of the carrier web and a tough, flexible layer over the hard layer for greater strength. Other variations in the number and kind of layers in the label face film may also be used.

Any radiation-curable liquid capable of forming a solid, flexible film upon curing may be used in forming the label face films. A copolymerizable mixture of prepolymers and monomers that is curable or polymerizable to a solid state by exposure to radiation is preferred.

Preferred monomers are acrylate monomers including acrylic acid, lower alkylacrylic acids such as methacrylic acid, and esters thereof. Preferred prepolymers are acrylated epoxy resins, acrylated polyester resins, acrylated urethane resins such as acrylated polyether-polyisocyanate resins and acrylated polyester-polyisocyante resins. It is preferred that the monomers employed include at least one monomer having two or more acrylate groups to promote rapid cross-linking polymerization, such as trimethylolpropane triacrylate. Additional cross-linkers include pentraerythritol-tetraacrylate and pentaerythritol triacrylate. Of the two, the tetraacrylate is preferred for faster cure rate and improved release of the cured film from the release surface of the carrier web. Useful acrylated epoxy resins are commercially available, for example; XD-8079 from Dow Chemical Company.

Useful acrylated polyether-polyisocyanate resins and monomer solutions thereof for radiation curing are described in U.S. Pat. No. 3,989,609, the entire disclosure of which is incorporated herein by this reference. This patent describes compositions comprising a liquid prepolymer which is the reaction product of a polyisocyanate with a polyether triol and an unsaturated alcohol such as allyl alcohol, a copolymerizable acrylate ester monomer, and at least one monomer having three or more unsaturated acrylate or methacrylate groups to promote cross linking. Other radiation polymerizable film forming resins useful in the present invention are described in U.S. Pat. No. 3,844,916, the entire disclosure of which is incorporated herein by this reference.

U.S. Pat. No. 3,857,768 describes polyacrylate-methacrylate compositions useful in the present invention. The entire disclosure of this patent is incorporated herein by this reference.

The viscosity of the radiation-curable liquid may be varied by altering the relative proportions of the prepolymer and the copolymeriable monomer. Increasing the proportion of monomer will decrease the viscosity of the composition and vice versa. The viscosity is preferably relatively low so that a thin film of the liquid can be applied with conventional printing or coating equipment. The optimum viscosity depends, of course, upon the particular printing or coating equipment employed and can thus be readily determined by one skilled in the operation of such equipment.

The radiation curable liquid may also include a wetting agent to improve wetting of the release surface on the carrier web, and an antifoam agent. Other ingredients such as pigments, dyes, leveling and flow promoting agents, inhibitors, or the like may also be included.

Indicia, where desired, are printed over the cured face film. Conventional inks may be employed. Radiation curable inks are preferred. Indicia formed from radiation curable inks comprise a reaction product of radiation-polymerizable monomers. When ultraviolet light is used, radiation cured indicia also comprise the residue of at least one photoinitiator formed by exposure thereof to ultraviolet light. Commercially available inks or inks made by adding coloring agents such as pigments or dyes to the radiation polymerizable liquids described above may be used.

A method of preparing label assemblies without die cutting is described in U.S. Pat. No. 4,022,926 to Keough, et al., the disclosure of which is incorporated herein by this reference. The patent describes a method comprising printing over the release surface of a temporary carrier web, a liquid pressure sensitive adhesive in a pre-determined pattern of discrete label areas separated by intervening areas of the carrier, solidifying the adhesive surface, forming a continuous film of radiation polymerizable liquid over each adhesive area, the film over each area being unconnected to films over adjacent areas, and exposing the films to radiation sufficiently to solidify them by polymerization. Indicia may then be printed on top of the solidified films. An overcoating over the indicia and base layer may be provided to add chemical or abrasion resistance. This method lends itself to rapid continuous production of label assemblies on carrier web and avoids the waste incident to the practice of die cutting and stripping of a matrix.

Other layers may be included if desired, such as tie-coatings between layers to improve adhesion or an opaque coating between over the indicia and the face film and to provide a background of contrasting color for the indicia when viewed through the face film.

The carrier web 10 may be a plastic film or sheet having desirable release properties such as polyethylene or polypropylene. Other materials such as polyester films, for example, Mylar (trademark of E. I. DuPont de Nemours and Company) may be used when treated with a suitable release agent including stearatometal complexes such as Aluminum Complex 101 from Du Pont. For reasons of economy the carrier web 10 may be paper, such as kraft or glassine having a release surface 12, ordinarily coated with low-density polyethylene. Protective backing 22 is a conventional glassine or kraft paper backing having a silicone coated release surface 24.

Any conventional pressure-sensitive adhesive that can be applied in liquid form to the cured face films on the carrier web and solidified thereon may be used in the practice of this invention. It is preferable to apply the liquid adhesive substantially in register with the cured face films so that the layer of applied adhesive is coextensive with the face film and does not flow onto areas of the carrier web release surface between the discrete label face films. The liquid adhesive can be applied by any conventional printing or coating method capable of selectively applying the adhesive to the cured face films. The adhesive can be applied as a solvent solution. Preferably for speed and avoidance of solvent fumes, the adhesive is applied as a molten hot melt or as a radiation curable liquid. The adhesive can be applied through a mask or by a technique such as silk screen printing.

Radiation polymerizable pressure sensitive adhesive liquids are known and are described, for example, in an article entitled, "Radiation Polymerization for Pressure Sensitive Adhesives," CHEM-TECH, September, 1974, pages 539-543, and incorporated herein by this reference. Such adhesives as disclosed therein also include hot melt pressure sensitive liquids. Radiation curable pressure sensitive adhesive liquids may also be made by incorporating tackifying resins into the radiation curable acrylate systems described above for use in forming the label face films or by employing suitable acrylic elastomers of the type used in conventional synthetic pressure sensitive adhesives which have reactive groups copolymerizable by radiation with acrylate monomers and prepolymers. A layer of pressure sensitive adhesive formed by irradiating radiation curable liquid comprises a reaction product of radiation-polymerized monomers. When ultraviolet radiation is used, the layer of adhesive also comprises the residue of at least one photoinitiator formed by exposure thereof to ultraviolet light.

A preferred embodiment of the present invention is illustrated in FIG. 2 in which carrier webs 26, 34, and 36 comprise a paper web 32 such as kraft or glassine having one one side a first release surface 28 and on the other side a second release surface 30. The carrier web 26 acts as both a carrier web for a label 31 which has been formed on the carrier web as described above and as a protective backing for another label 31' on an adjacent portion of carrier web 34. Another portion 36 of carrier web covers and protects the adhesive of label 31 on the portion 26 of carrier web. Portion 36 of carrier web is shown partially removed to illustrate how the label 31 remains releasably adhered to portion 26 of carrier web. A construction as illustrated in FIG. 2 can be made by forming labels as described above on a carrier web having a release surface for the face film of the labels on one side and release surface for the adhesive on the other side. A plurality of portions of carrier web having such labels releasably adhered thereto are then laminated to provide a cohesive laminate or blocking stack comprising alternating layers of label and carrier web. Release surface 28 on the carrier web corresponds to release surface 12 in FIG. 1. Release surface 30 on the carrier web corresponds to release surface 24 on the protective backing in FIG. 1. Thus, when two portions of carrier web having a label between them are peeled apart, the release surface 30 preferentially releases from the adhesive side of the label, thus exposing the adhesive while leaving the label releasably adhered to the release layer 28 of the portion of carrier web upon which the label was formed.

Labels made as illustrated in FIG. 2 are convenient to use. A plurality of sheets of carrier web having labels thereon are laminated to form a cohesive laminate or stack of labels and sheets of carrier web. Each sheet of carrier web may have one or more labels on it. Preferably the laminated stack is covered with a sheet of carrier web having no labels thereon, as illustrated. When it is desired to apply a label, the topmost piece of carrier web is peeled away exposing the adhesive of an underlying label. The laminated stack of labels is then manipulated to apply the exposed label to a substrate. The stack is then removed from the substrate leaving the label adhered to the substrate. Another piece of carrier web can then be removed from the top of the stack leaving another label exposed, and so on.

FIG. 3 and 4 illustrate another preferred embodiment of the present invention. FIG. 3 illustrates a self-wound roll 38 of labels 14 on a continuous strip of carrier web 40. As illustrated more clearly in FIG. 4, the carrier web 40 comprises a paper web 32 having a first release coating 28 on one side and a second release coating 30 on the other side. Release surface 28 as described above is, for example, polyethylene. Release surface 30 is, for example, silicone.

The relative release properties of the release surfaces 28 and 30 are such that when a portion of carrier web 40 is unwound from the roll the labels remain releasably adhered to the portion of carrier web being unwound and the adhesive side of each label is exposed. Thus, a portion of carrier web with a label thereon can be unwound from the roll and the label thereon transferred to a substrate. It is apparent that such a label construction can be readily adapted to dispensing with a mechanical label dispenser. For example, the carrier web bearing a label may be passed between a roller and a substrate with the adhesive side of the label contacting the substrate under the roller so that the label is transferred to the substrate.

The embodiment of the invention illustrated in FIG. 3 and FIG. 4 is called a "self-wound" roll because the coils of the roll are adhered to one another through the layers of adhesive 20 on the labels much as the coils of a roll of ordinary adhesive tape are adhered to one another. When a strip of ordinary labels in which the adhesive is between the carrier web and the facestock of the label is wound upon itself to form a roll, the coils of the roll do not adhere to one another, and such a roll is not "shelf-wound" as the term is used herein.

FIG. 5 illustrates a label of the present invention as it appears after being applied to a substrate 42. The layer of adhesive 20 secures the label to the substrate. The indicia 18 are between the adhesive and the face film of the label, which protects the indicia from wear and abrasion but permits the indicia to be observed.

FIG. 6 illustrates another label of the present invention as applied to a substrate 42. The label comprises a layer of adhesive 20, indicia 18, face film 16, and in addition a layer 44 between the adhesive on the one hand and the face film and indicia on the other to provide a background for the indicia of contrasting color. Both the indicia 18 and portions of layer 44 are observable through the face film 16. The background layer 44 is preferably formed by applying a radiation curable liquid in register over the cured face film and dried or cured indicia and then curing the liquid by exposure to radiation. The layer of radiation cured material may be substantially opaque.

FIG. 7 schematically illustrates a method for making a self-wound roll of labels in accordance with the preferred embodiment of this invention. A continuous strip of carrier web 61 is unrolled from a roll 60. The carrier web 61 has a first release coating 28 on one side, and a second release surface 30 on the other side as previously described. The web passes through a coating or printing station 52 which may be any suitable press such as a flexographic rotograver or rotary screen press. At printing station 52 a radiation curable liquid composition is applied in a predetermined pattern of discrete areas corresponding to the labels being made. The liquid is applied as a continuous film within each discrete area of the carrier web but is not applied to portions of the carrier web outside the discrete areas. A sufficient thickness of radiation curable liquid is applied in one or more layers to provide a cured label face film having a thickness of at least about 0.1 mil. A label face film of any desired thickness may be built up by applying and curing a plurality of layers of radiation curable liquid. In accordance with a preferred embodiment of this invention, the thickness of the face film is between about 0.1 and about 1.5 mil, more preferably between about 0.3 and about 1.0 mil.

The carrier web 61 carrying the discrete areas of applied radiation curable liquid advances past a source of ultraviolet radiation 53. The intensity of radiation and the time of exposure are suffient to at least partially solidify and preferably to fully cure the radiation curable liquid within the discrete areas on the carrier web. The carrier web carrying thus formed label face films advances to printing or coating station 54 in which indicia are printed on the label face films using a radiation curable ink. The web then advances past source 55 of ultraviolet radiation where the ink in the indicia is cured. It should be noted that because the indicia will be viewed through the film upon which they are printed they must be printed in reverse upon the label face films so that when viewed through the films they will appear correct, left to right. The carrier web advances then through printing or coating station 56 in which a background layer of radiation curable liquid is applied over the indicia and the face film to provide a background of contrasting color to the indicia. The background layer may be applied over only a portion of each label face film or it may be substantially coextensive with each label face film. However, background layer is not applied to portions of the carrier web between the discrete label face films thereon. The web advances past ultraviolet source 57 where the background layer is cured. The web then advances to printing or coating station 58 at which pressure sensitive adhesive in liquid form is applied over the background layer and substantially in register with the label face films but is not applied to portions of the carrier web between the discrete labels being made. The adhesive is preferably a radiation curable liquid adhesive which is then cured to a semi-solid tacky adhesive state at ultraviolet source 59. The web 61 now carrying a series of finished labels is then wound upon itself in the manner shown with the adhesive sides of the labels facing toward the center of the roll. The coils of the rolls adhere to one another to provide a self-wound roll 65 having the desirable characteristics hereinabove described.

If desired, to assure that all the layers of the finished label are fully cured, an additional source of radiation 63, for example, ultraviolet radiation or electron beam radiation may be provided after the ultraviolet source 59. When a plurality of discrete labels are formed side by side on the web as it advances past the printing stations and sources of radiation, the carrier may be slit with a conventional slitter between rows of labels to provide individual self wound rolls of labels.

Specific ultraviolet radiation curable coating compositions useful for forming the label face films 16 are given below in Examples I and II. The formulation in Example II is preferred.

EXAMPLE I

UV Curable 100% Solids Liquids

| UV Curable 100% Solids Liquids | Parts by Weight |
|---|---|
| XD-8079 | 10.0 |
| Uvimer 540 | 20.0 |
| Wetting agent | 0.3 |
| Witco 3054 | 0.2 |
| dioctylphthalate | 0.3 |
| diethoxyacetophenone | 0.5 |

XD-8079 is a UV curable acrylated epoxy composition of Dow Chemical Corporation. Uvimer 540 is a polyethylenically unsaturated liquid prepolymer of high reactivity available from the Polychrome Corporation. The wetting agent is a silicone wetting agent from Dow Corning Corporation. Witco 3054 is a silicone antifoam agent from Witco Chemical Corporation. Dioctylphthalate is a plasticizer and diethoxyacetophenone is a photoinitiator for curing by ultraviolet radiation.

EXAMPLE II

| | |
|---|---|
| Uvimer 745 | 30.0 |
| polyethylene glycol diacrylate | 3.0 |
| trimethylol propane triacrylate | 1.0 |
| 1, 6, hexanediol diacrylate | 5.0 |
| 2 hydroxyethyl acrylate | 3.0 |
| diethoxyacetophenone | 0.4 |

Uvimer 745 is another polyethylenically unsaturated liquid oligomer of the Polychrome Corporation. The next four ingredients are reactive monomers.

EXAMPLE III

A piece of commercially available kraft paper carrier having a low density polyethylene release surface on one side was coated on the other side with a conventional silicone release agent which was dried and cured on the paper. By means of flexographic printing discrete areas on the polyethylene coated side of the carrier were coated with a 0.3 mil thick layer of the radiation curable liquid formulation of Example II. The carrier was then passed under a medium pressure mercury lamp as a source of ultraviolet radiation. The lamp was rated at 200 watts per inch and the carrier was passed about ½ inch from the lamp at the rate of 50 feet per minute. The liquid was fully cured to provide discrete label face films on the carrier.

Indicia were then printed on the label face films with a standard solvent-based flexographic ink and dried with a stream of hot air. A 0.3 mil thick layer of a commerically available pressure sensitive adhesive comprising a rosin ester modified styrene-isoprene block copolymer solution diluted to about 30 weight percent solids with toluene was then applied in register over the label face films and indicia and allowed to dry. Sheets of carrier web bearing thus formed labels were laminated to form a cohesive stack and then separated. Upon separation of adjacent sheets of carrier web, labels remained adhered to the sheet of carrier web upon which they were formed and the adhesive sides of the labels were exposed. The adhesive side of a label still releasably adhered to its carrier sheet was applied to a sheet of paper and the carrier sheet was removed. The label transferred cleanly from the carrier sheet to the paper, and had a thickness of about 0.6 mil.

Although the present invention has been described with reference to particular details and embodiments thereof, the particulars of the description are not intended to limit the invention, the scope of which is defined in the following claims:

What is claimed is:

1. A label construction comprising:

a temporary carrier having a release surface;

a label releasably adhered to the release surface, the label comprising a face film in contact with the release surface and a layer of pressure sensitive adhesive on the side of the face film opposite the carrier and substantially in register with the face film, the face film comprising a radiation-cured polymer; and a protective backing having a release surface in contact with the adhesive layer, the adhesion between the adhesive and the release surface of the protective backing being weaker than the adhesion between the face film and the release surface of the carrier, whereby the protective backing can be removed from such a label to expose the layer of adhesive while leaving the label releasably adhered to the carrier.

2. A label construction according to claim 1 in which the thickness of the label, face films is between about 0.1 and about 1.5 mils.

3. A label construction according to claim 1 in which the temporary carrier has both a first release surface and a second release surface, and the protective backing is a portion of such temporary carrier.

4. A label construction comprising a continuous temporary carrier web having at least a first and a second portion and having a first release surface and a second release surface on opposite sides of the carrier web, the first portion of the continuous temporary carrier web having a plurality of discrete labels releasably adhered to the first release surface, each label comprising a face film in contact with the first release surface and a layer of pressure-sensitive adhesive substantially in register with the face film on the side of the face film opposite the first portion of carrier web, the face film comprising a radiation cured polymer; and the second release surface of the second portion of the carrier web being in contact with the layer of adhesive of such labels on the first portion of the carrier web, the adhesion between the layer of adhesive and the second release surface being weaker than the adhesion between the face film and the first release surface, whereby the second portion of carrier web can be removed from such labels to expose the layer of adhesive while leaving such labels releasably adhered to the first portion of carrier web.

5. A label construction according to claim 4 which comprises a plurality of sheets of a temporary carrier web having such labels releasably adhered thereto, the adhesive on labels on one such sheet being in contact with the second release surface of an adjacent sheet.

6. A label construction according to claim 4 comprising a continuous strip of a temporary carrier web having such labels releasably adhered thereto and being wound into a roll.

7. A label construction according to claim 4 in which each label further comprises indicia between the face film of the label and the layer of adhesive.

8. A label construction according to claim 7 in which the indicia comprises a radiation cured ink.

9. A label construction according to claim 7 comprising an additional layer of radiation cured material over the indicia and between the face film and the layer of adhesive.

10. A label construction according to claim 9 in which the additional layer of radiation cured material is substantially opaque.

* * * * *

UNITED STATES PATENT AND TRADEMARK OFFICE

CERTIFICATE OF CORRECTION

PATENT NO. : 4,219,596

DATED : August 26, 1980

INVENTOR(S) : Shiro G. Takemoto and Yukihiko Sasaki

It is certified that error appears in the above—identified patent and that said Letters Patent is hereby corrected as shown below:

Column 5, line 15, change "copolymeriable" to -- copolymerizable --.

Column 5, line 59, after "may" insert -- also --.

Column 6, line 50, change "one" first occurrence to -- on --.

Column 7, line 57, change "shelf-wound" to -- self-wound --.

Column 8, line 36, change "suffient" to -- sufficient --.

Signed and Sealed this

*Twenty-second* Day of *December 1981*

[SEAL]

*Attest:*

GERALD J. MOSSINGHOFF

*Attesting Officer* *Commissioner of Patents and Trademarks*